No. 626,620. Patented June 6, 1899.
J. S. LAMAR.
MANUALLY PROPELLED VEHICLE.
(Application filed June 6, 1898.)
(No Model.)
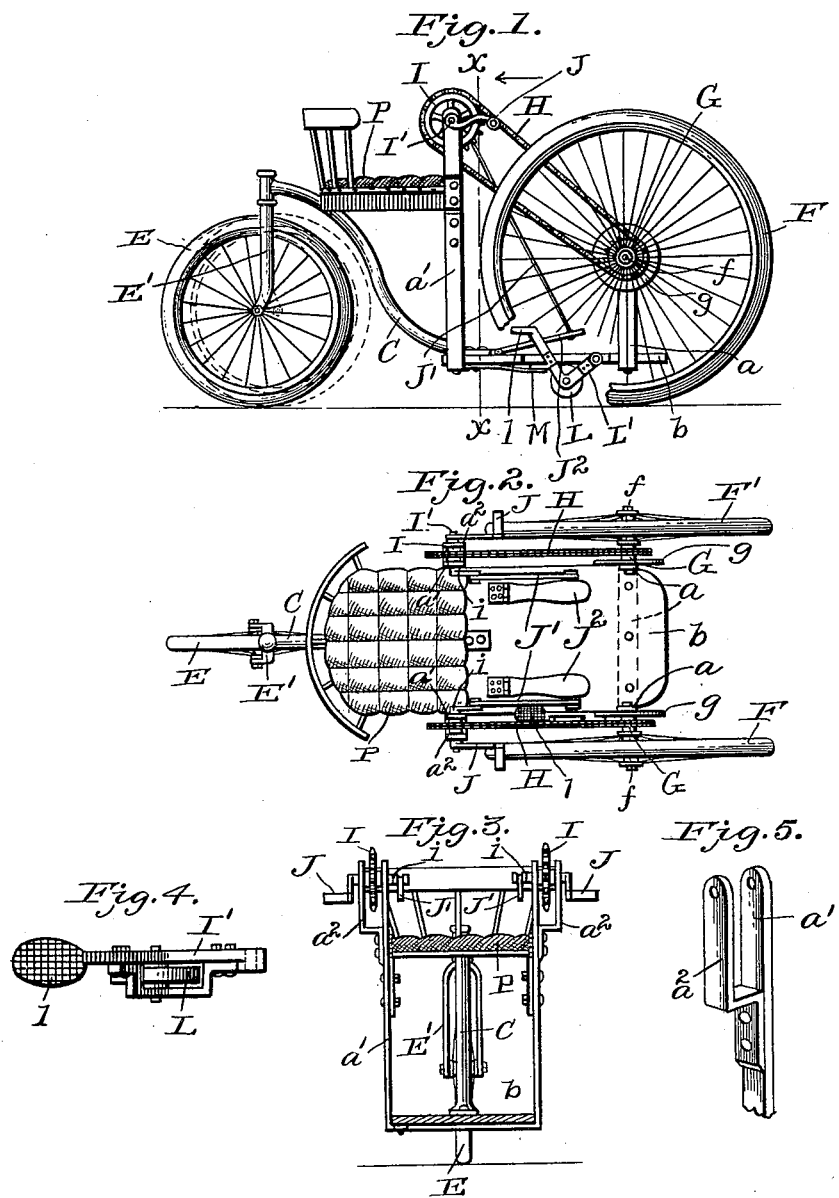
WITNESSES:
Edwin H. McKee
Philip C. Masi.
INVENTOR
J. S. Lamar,
BY E. W. Anderson,
his ATTORNEY.
THE NORRIS PETERS CO., PHOTO-LITHO., WASHINGTON, D. C.

UNITED STATES PATENT OFFICE.

JAMES S. LAMAR, OF GROVETOWN, GEORGIA.

MANUALLY-PROPELLED VEHICLE.

SPECIFICATION forming part of Letters Patent No. 626,620, dated June 6, 1899.

Application filed June 6, 1898. Serial No. 682,649. (No model.)

*To all whom it may concern:*

Be it known that I, JAMES SANFORD LAMAR, a citizen of the United States, and a resident of Grovetown, in the county of Columbia and State of Georgia, have invented certain new and useful Improvements in Manually-Propelled Vehicles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side elevation of a vehicle embodying the invention, one of the wheels being partially broken away. Fig. 2 is a plan view of the same. Fig. 3 is a vertical section on the line $x\,x$ of Fig. 1. Fig. 4 is a detail view of the roller device, and Fig. 5 is a perspective detail view showing a portion of the frame.

This invention has relation to manually-propelled vehicles in the nature of tricycles, and is designed to provide a vehicle of this character which is strong and durable in its construction, which is easily and safely operated, and is adapted for use by persons who cannot or do not care to ride a bicycle, and which affords a pleasurable and healthful exercise for the rider, its propelling devices being of such character as not only to permit a more effective application of power than is possible in a bicycle, but are designed to bring into play those muscles and portions of the body which most require exercise and which are brought into action but little, if at all, in riding a bicycle.

Other objects and advantages of the invention will hereinafter appear.

With these objects in view the invention consists in the novel construction and combination of parts, all as hereinafter described, and pointed out in the appended claims.

Referring to the accompanying drawings, the letters $a\,a'$ designate the main frame of the vehicle, which is composed of two angular bars having transversely-extending portions which support a floor or platform $b$, secured thereto, and vertical lateral arms which provide support for certain parts of the vehicle hereinafter described.

C is an upwardly and rearwardly extending arm which is securely bolted at its forward end to the central rear portion of the floor $b$ and which is provided with an aperture at its rear portion to receive the stem or spindle of the fork $E'$ of a caster-wheel E.

F F' designate the two front wheels, which are similar in construction to bicycle-wheels. These wheels are loosely mounted on short axles $f$, which are supported by and project laterally from the vertical arms of the frame-piece $a$. Secured to the hub of each of said wheels to turn therewith is a small sprocket-wheel G, having a guard-flange $g$, and which is connected by a chain H with a larger sprocket-wheel I, rigidly mounted on a short shaft I'. The shafts I' (there being one at each side) are journaled in bearings in the upper portions of the vertical arms of the frame-piece $a'$ and in brackets $a^2$, bolted to said arms, and are fitted at their outer ends with hand-cranks J. The inner end of each shaft I' has a short crank $i$, which is connected by a pitman J' with a treadle $J^2$. These pitmen are made detachable, so that they can be removed when not required. For ordinary riding the hand-cranks will afford ample power to propel the machine; but in riding for a considerable distance it will be found restful to the rider to change occasionally from hand to foot power or to use both at the same time.

L designates a roller which is situated underneath the floor or platform $b$ near one of the wheels F and is journaled to a pivoted arm L', which has a projection $l$ extending above the platform in position where it may be readily pressed by the foot.

M designates a suitably-arranged spring which acts on the said arm L' to normally hold said roller out of contact with the ground. This spring may be omitted and the roller be allowed to run on the ground at all times; but I prefer to use the spring.

P designates the seat, which is supported between the upright portions of the frame-piece $a'$ and upon the arm C. This seat may be of any suitable character.

The caster-wheel E is of the same general character as the front wheels, care being taken that its axle $e'$ shall operate at a short distance only—say about one inch—from the vertical center line passing through the fork stem or spindle, in order that said spindle may turn easily in any position of the wheel, the latter being almost directly under the point of pressure. The upward curve or arch of the frame-arm C permits said wheel to turn back thereunder, as indicated in Fig. 1, so that the vehicle may be readily backed. The arm C also forms a mud-guard or shield for the wheel E', and the wheels F may also be provided with guards.

Arranged and put together as above described it will be seen that the entire framework is perfectly rigid, while at the same time it is quite light and capable of a neat and attractive appearance.

The rider when sitting on the seat P has ample foot-room upon the floor or platform $b$ and can grasp the handles of the cranks J without stretch or strain. To make a turn, the rider simply retards the movement of that wheel F which is on the side of the shorter curve, (the side toward which he is turning,) and when the turn has been made he again moves straight forward. In retarding one of the wheels F, however, the handles of the two cranks have likely lost their coincidence and the two hands of the rider are no longer rhythmic in their action and their movement will be more or less awkward and unsatisfactory. The coincidence cannot be restored by revolving the other wheel faster, for the effect of that would be to turn the carriage in the opposite direction. The difficulty is, however, completely overcome by the use of the roller L, since by pressing the foot upon the projection $l$ of the arm L' said roller is thrust forward and downward, raising the adjacent wheel F from the ground and the two hands are almost without conscious effort brought into concurrent movement. As soon as the pressure of the foot is relieved the parts assume their normal positions.

Having thus described my invention, what I claim as new, and desire to secure by Letters Patent, is—

1. In a vehicle of the character described, the combination with the two loosely-mounted traction driving-wheels, and with independent driving mechanisms therefor, of a foot-operated roller device mounted adjacent to one of said wheels, and adapted to be brought into contact with the ground to raise the said wheel off the ground, substantially as specified.

2. In a vehicle of the character described, the combination of the two loosely and independently mounted traction-wheels, the rear driving-wheel, independent driving means for the driving-wheels, and means carried by the vehicle and operated by foot-pressure of the rider for raising one of said wheels from the ground, substantially as specified.

3. In a vehicle of the character described, the combination with the two front traction-wheels, separate devices for driving each of said wheels, and the rear caster-wheel, of the roller adjacent to one of the traction-wheels, the pivoted arm which carries the same, and which has a foot projection and a spring acting upon said arm, substantially as specified.

4. In a vehicle of the character described, the frame consisting of the angular front piece having short upright lateral portions, the rear angular piece having similar but longer lateral arms, said pieces having their transverse lower portions parallel and in the same horizontal plane, the low platform supported by said transverse portions, the rearwardly and upwardly extended arm secured to the rear portion of the platform, the caster-wheel having its fork swiveled in said arm, the seat supported at its rear portion on the said arm and at its front portion by the uprights of the rear frame-piece, the traction driving-wheels journaled to the lateral arms of the front frame-piece above the level of the platform, the independent short shafts journaled in the upper portions of the rear frame-piece, means for actuating said short shafts, and gearing connecting the same with the axles of the traction-wheels, substantially as specified.

In testimony whereof I affix my signature in presence of two witnesses.

JAMES S. LAMAR.

Witnesses:
PHILIP C. MASI,
GEO. M. ANDERSON.